US010783024B2

United States Patent
Tomic et al.

(10) Patent No.: US 10,783,024 B2
(45) Date of Patent: Sep. 22, 2020

(54) REDUCING BLOCK CALIBRATION OVERHEAD USING READ ERROR TRIAGE

(71) Applicant: International Business Machines Corporation, Armonk, NY (US)

(72) Inventors: Sasa Tomic, Kilchberg (CH); Timothy J. Fisher, Cypress, TX (US); Nikolaos Papandreou, Thalwil (CH); Roman A. Pletka, Uster (CH); Nikolas Ioannou, Zurich (CH); Charalampos Pozidis, Thalwil (CH); Aaron D. Fry, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/159,422

(22) Filed: Oct. 12, 2018

(65) Prior Publication Data

US 2020/0117527 A1    Apr. 16, 2020

(51) Int. Cl.
| | |
|---|---|
| *G06F 11/07* | (2006.01) |
| *G06F 11/14* | (2006.01) |
| *G06F 12/02* | (2006.01) |
| *G06F 11/10* | (2006.01) |

(52) U.S. Cl.
CPC ........ *G06F 11/076* (2013.01); *G06F 11/0793* (2013.01); *G06F 11/1016* (2013.01); *G06F 11/1402* (2013.01); *G06F 12/0246* (2013.01)

(58) Field of Classification Search
CPC ............... G06F 11/076; G06F 11/0793; G06F 11/1016; G06F 11/1402; G06F 12/0246
USPC ....... 714/704, 718, 742, 760, 763, 769, 770, 714/773, 819; 365/185.09, 185.24, 365/185.33, 184, 130, 200, 201, 235, 236
See application file for complete search history.

(56) References Cited

U.S. PATENT DOCUMENTS

| | | | |
|---|---|---|---|
| 8,966,343 B2 | 2/2015 | Syu et al. | |
| 9,053,012 B1 | 6/2015 | Northcott et al. | |
| 9,563,373 B2* | 2/2017 | Camp | ................... G06F 3/0619 |
| 9,583,205 B2* | 2/2017 | Camp | ................ G11C 16/3427 |
| 10,410,730 B1* | 9/2019 | Boenapalli | ............. G11C 16/32 |
| 10,453,537 B1* | 10/2019 | Reuter | ................. G11C 29/028 |
| 2014/0250348 A1* | 9/2014 | Harari | ..................... G11C 29/84 |
| | | | 714/773 |
| 2015/0339188 A1* | 11/2015 | Hu | ....................... G06F 11/1072 |
| | | | 714/704 |
| 2016/0077903 A1* | 3/2016 | Reddy | ................. G06F 11/0727 |
| | | | 714/704 |

(Continued)

*Primary Examiner* — John J Tabone, Jr.
(74) *Attorney, Agent, or Firm* — Zilka-Kotab, P.C.

(57) ABSTRACT

A computer-implemented method, according to one embodiment, includes: detecting that an error count resulting from reading a first page in a block of storage space in memory is above a first threshold, and reading a second page in the block of storage space. The second page is one which had a highest error count of the pages in the block of storage space following a last calibration of the block of storage space. Moreover, a determination is made as to whether an error count resulting from reading the second page is above the first threshold. In response to determining that the error count resulting from reading the second page is above the first threshold, the block of storage space is calibrated. Other systems, methods, and computer program products are described in additional embodiments.

20 Claims, 11 Drawing Sheets

(56) References Cited

U.S. PATENT DOCUMENTS

| | | | |
|---|---|---|---|
| 2016/0110124 A1* | 4/2016 | Camp | G06F 11/073 |
| | | | 714/704 |
| 2016/0188405 A1 | 6/2016 | Li et al. | |
| 2017/0091006 A1 | 3/2017 | Camp et al. | |
| 2018/0341553 A1* | 11/2018 | Koudele | G11C 11/5642 |
| 2019/0171381 A1* | 6/2019 | Ioannou | G06F 3/0604 |
| 2019/0179741 A1* | 6/2019 | Liu | G11C 29/76 |
| 2019/0278643 A1* | 9/2019 | Camp | G06F 3/0653 |
| 2019/0348130 A1* | 11/2019 | Reuter | G11C 16/34 |
| 2020/0004632 A1* | 1/2020 | Koudele | G11C 11/5642 |
| 2020/0066353 A1* | 2/2020 | Pletka | G06F 3/0679 |

\* cited by examiner

US 10,783,024 B2

REDUCING BLOCK CALIBRATION OVERHEAD USING READ ERROR TRIAGE

BACKGROUND

The present invention relates to data storage systems, and more particularly, this invention relates to calibrating blocks of storage space in non-volatile memory.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

The raw bit error rate (RBER) of a Flash memory block will typically increase over time due to additional program and erase cycling, charge leakage from retention, and additional charge placed in the cells by read operations (i.e., read disturb errors). Typically, a Flash memory block is retired when any page in the block exhibits a code word that reaches a page retirement error count limit. This limit is typically set to be achieved in conjunction with an appropriate error correction code (ECC), resulting in the Uncorrectable Bit Error Rate (UBER) after applying the ECC for a Flash memory block being set to be similar to the UBER in traditional hard disk drives, e.g., at around $10^{-15}$, but may be more or less.

Read voltage shifting, also known as block calibration, has been shown to be a key contributor to enhance endurance and retention, particularly for enterprise-level Flash memory systems using modern three-dimensional (3-D) triple-level-cell (TLC) or quad-level-cell (QLC) NAND Flash memory. Previous attempts to maintain efficient memory performance typically included inspecting the read voltages for each block of memory in a sweeping fashion or by a read voltage shifting algorithm that tracks and corrects the read voltages depending on how the threshold voltage distributions have changed as a result of cycling or retention or other disturbing effects. Moreover, upon identifying a block which was a calibration candidate, these previous attempts would perform block-level calibrations in which all pages in the identified block would be calibrated. It follows that these previous attempts involved inspecting each block of memory individually. Furthermore, although a block of memory is identified as being a candidate for calibration, typically not all pages in the block benefit from the calibration.

SUMMARY

A computer-implemented method, according to one embodiment, includes: detecting that an error count resulting from reading a first page in a block of storage space in memory is above a first threshold, and reading a second page in the block of storage space. The second page is one which had a highest error count of the pages in the block of storage space following a last calibration of the block of storage space. Moreover, a determination is made as to whether an error count resulting from reading the second page is above the first threshold. In response to determining that the error count resulting from reading the second page is above the first threshold, the block of storage space is calibrated.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: detecting, by the processor, that an error count resulting from reading a first page in a block of storage space in memory is above a first threshold; and reading, by the processor, a second page in the block of storage space. The second page is one which had a highest error count of the pages in the block of storage space following a last calibration of the block of storage space. Moreover, a determination is made, by the processor, as to whether an error count resulting from reading the second page is above the first threshold. In response to determining that the error count resulting from reading the second page is above the first threshold, the block of storage space is calibrated by the processor.

A system, according to yet another embodiment, includes: a processor, and logic integrated with and/or executable by the processor. The logic is configured to: detect, by the processor, that an error count resulting from reading a first page in a block of storage space in memory is above a first threshold; and read, by the processor, a second page in the block of storage space. The second page is one which had a highest error count of the pages in the block of storage space following a last calibration of the block of storage space. Moreover, a determination is made, by the processor, as to whether an error count resulting from reading the second page is above the first threshold. In response to determining that the error count resulting from reading the second page is above the first threshold, the block of storage space is calibrated by the processor.

Other aspects and embodiments of the present invention will become apparent from the following detailed description, which, when taken in conjunction with the drawings, illustrate by way of example the principles of the invention.

DETAILED DESCRIPTION

Figure 1:
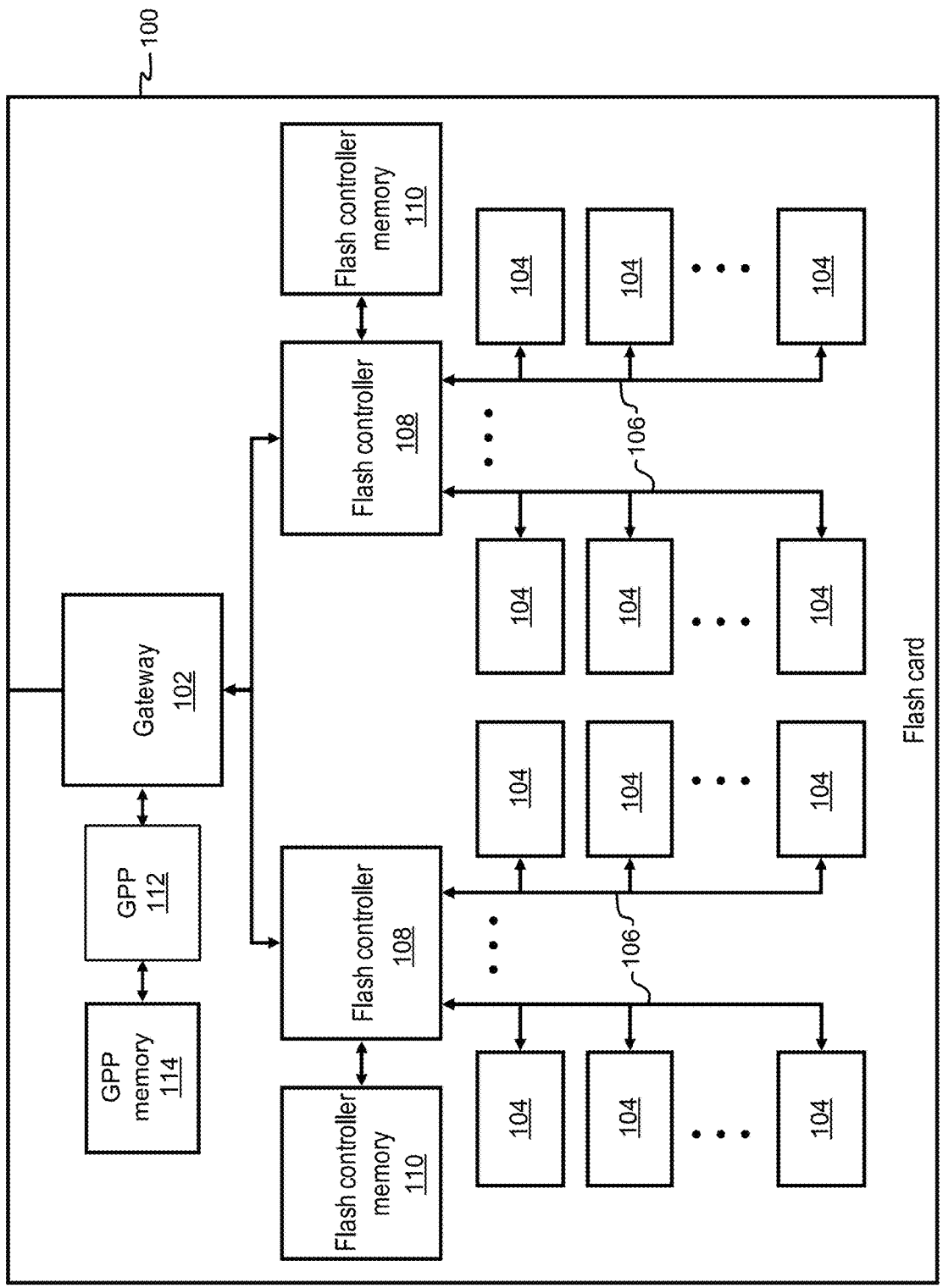
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: detecting that an error count resulting from reading a first page in a block of storage space in memory is above a first threshold, and reading a second page in the block of storage space. The second page is one which had a highest error count of the pages in the block of storage space following a last calibration of the block of storage space. Moreover, a determination is made as to whether an error count resulting from reading the second page is above the first threshold. In response to determining that the error count resulting from reading the second page is above the first threshold, the block of storage space is calibrated.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: detecting, by the processor, that an error count resulting from reading a first page in a block of storage space in memory is above a first threshold; and reading, by the processor, a second page in the block of storage space. The second page is one which had a highest error count of the pages in the block of storage space following a last calibration of the block of storage space. Moreover, a determination is made, by the processor, as to whether an error count resulting from reading the second page is above the first threshold. In response to determining that the error count resulting from reading the second page is above the first threshold, the block of storage space is calibrated by the processor.

In yet another general embodiment, a system includes: a processor, and logic integrated with and/or executable by the processor. The logic is configured to: detect, by the processor, that an error count resulting from reading a first page in a block of storage space in memory is above a first threshold; and read, by the processor, a second page in the block of storage space. The second page is one which had a highest error count of the pages in the block of storage space following a last calibration of the block of storage space. Moreover, a determination is made, by the processor, as to whether an error count resulting from reading the second page is above the first threshold. In response to determining that the error count resulting from reading the second page is above the first threshold, the block of storage space is calibrated by the processor.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
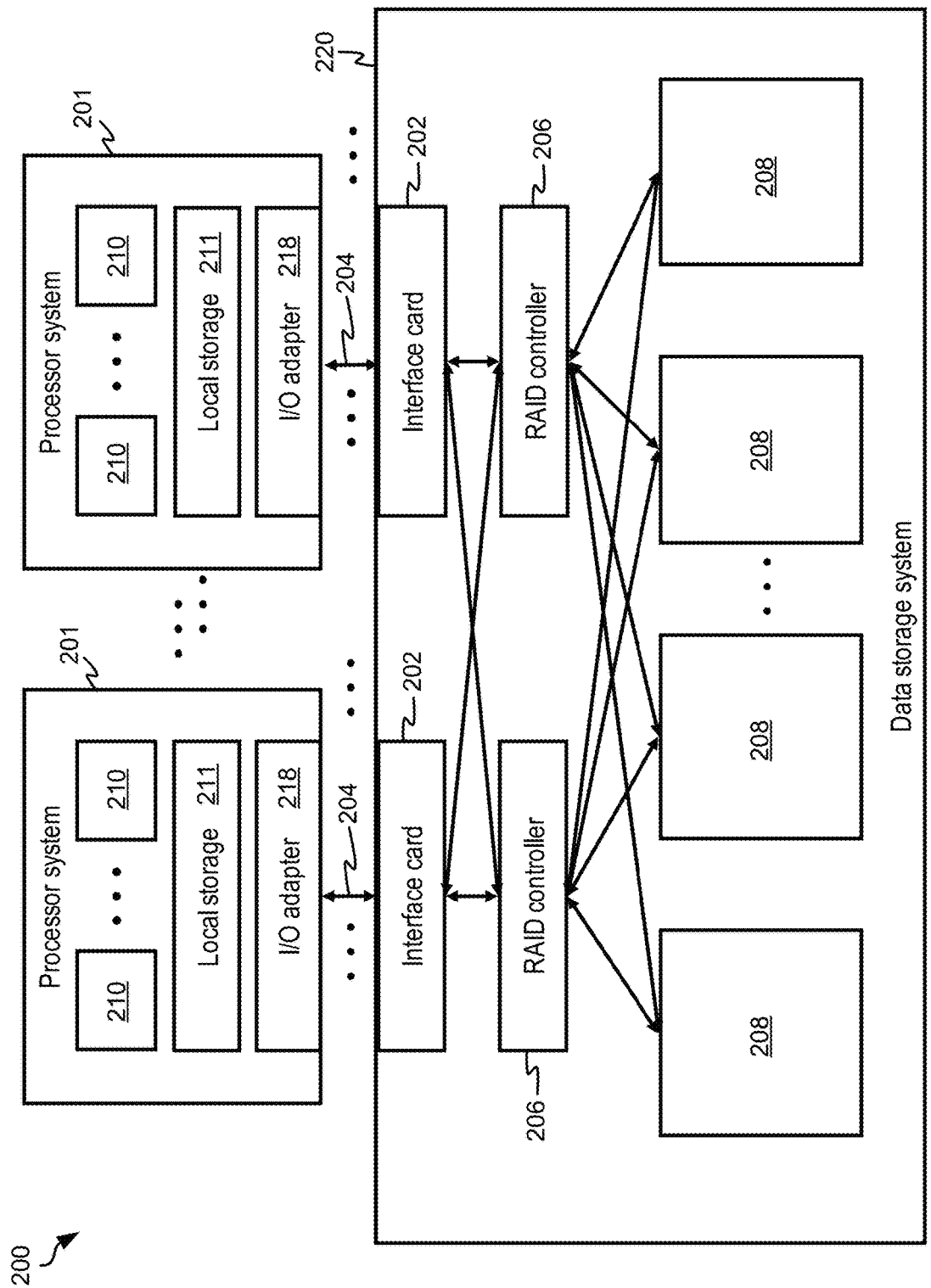
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-6, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore, the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
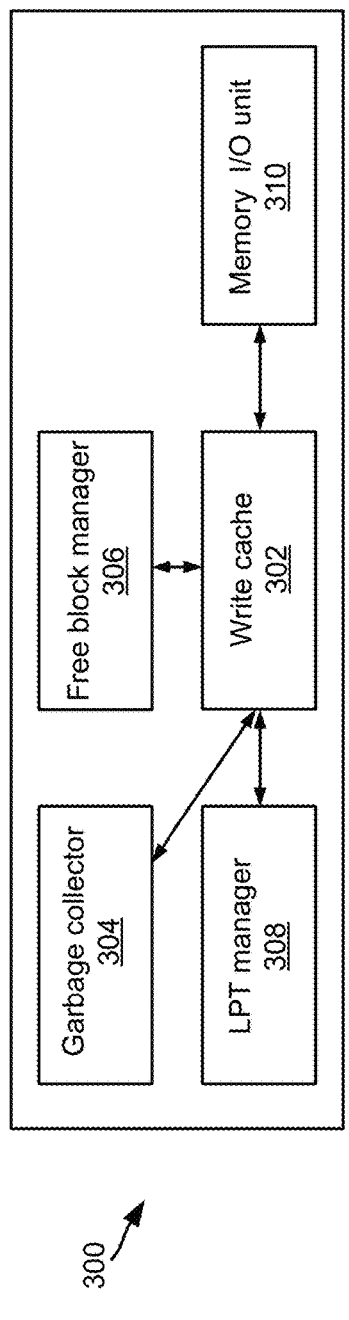
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages of memory. According to an example, which is in no way intended to limit the invention, the LPT manager 308 may maintain the logical-to-physical mappings of 4KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4A:
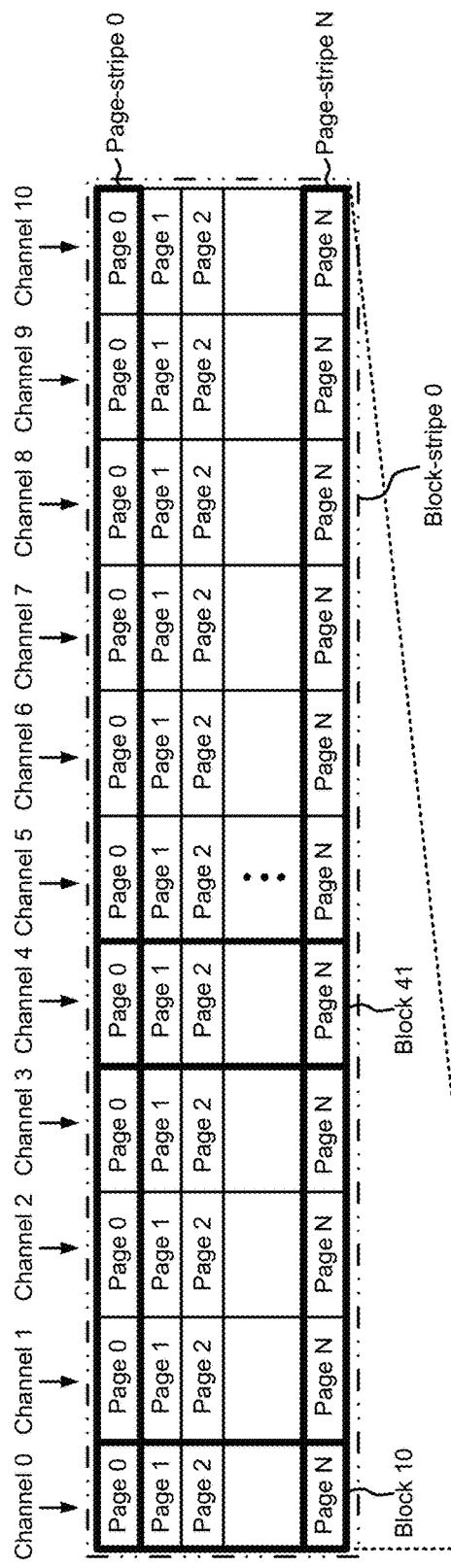
FIG. 4A is a conceptual diagram which includes a block-stripe and page-stripe, in accordance with one embodiment.

To better understand the distinction between block-stripes and page-stripes as used herein, FIG. 4A is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4A may be implemented in a cache architecture. However, depending on the desired embodiment, the conceptual diagram 400 of FIG. 4A may be implemented in defining the organization of data stored in non-volatile memory. Accordingly, both implementations are described in turn below.

Non-Volatile Memory

Looking now to FIG. 4A, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel forms a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4A, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4A, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4A is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 1024 pages, but could include more or less in various embodiments. Analogously, the number of channels per plane and/or the number of planes may vary depending on the desired embodiment.

Referring still to FIG. 4A, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Figure 4A:
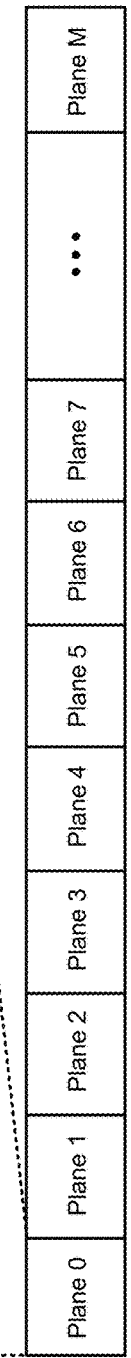
Figure 4B:
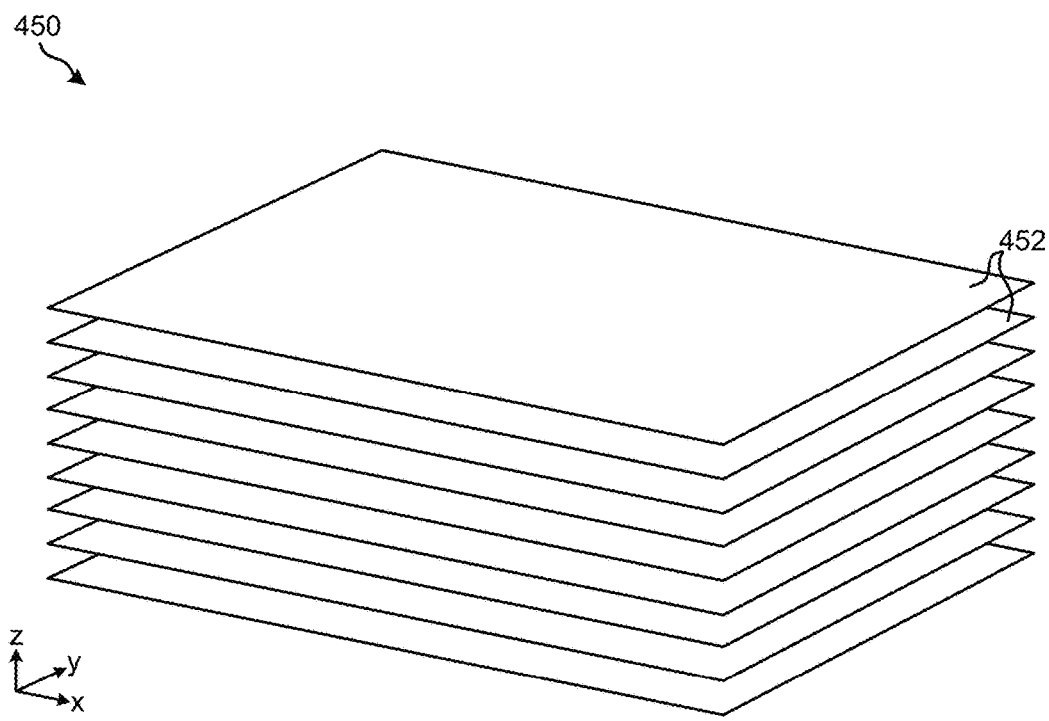
FIG. 4B is a partial perspective view of a 3-D non-volatile memory structure, in accordance with one embodiment.

The general storage architecture illustrated in the conceptual diagram 400 of FIG. 4A is also implemented by using 3-D memory structures in some approaches. For instance, FIG. 4B depicts a representational view of a 3-D non-volatile memory structure 450, in accordance with one embodiment. As an option, the present structure 450 may be implemented in conjunction with features from any other embodiment listed herein, such as those described with reference to the other FIGS., such as FIG. 4A. However, such structure 450 and others presented herein may be used in various applications and/or in permutations which may or may not be specifically described in the illustrative embodiments listed herein. Further, the structure 450 presented herein may be used in any desired environment. Thus FIG. 4B (and the other FIGS.) may be deemed to include any possible permutation.

As shown, each layer 452 of the 3-D non-volatile memory structure 450 extends along both the x-axis and the y-axis. Each of these layers 452 include a plurality of storage components (not shown), such as voltage supply lines, sensor stacks, transistors, etc., which are used to implement the non-volatile memory devices of the general storage architecture illustrated in the conceptual diagram 400 of FIG. 4A, e.g., as would be appreciated by one skilled in the art after reading the present description. Moreover, the various layers 452 are arranged in a stacked fashion along the z-axis in order to increase storage density and efficiency, e.g., by implementing shared wordlines. Cells from different bitlines along a wordline (typically in the x or y dimension of FIG. 4B) are logically combined to form pages: In TLC, each wordline in a block contains 3 physical pages (i.e., a lower page, an upper page, and an extra page) and a wordline typically belongs to one particular layer in the z dimension (perpendicular to the x-y plane). For a particular block, which is formed from a grid of cells connected by wordlines and bitlines, the number of wordlines residing on the same layer is typically small. Therefore, a block can be formed from wordlines of all layers 452. Moreover, wordlines as well as pages in the same block may reside on different layers 452.

Again, due to cycling, retention, read disturb, program disturb, etc., or other mechanisms that may be specific to the NAND storage technology (e.g., floating gate or charge trap), process technology (e.g., 2-D or 3-D), scaling node, etc., or other specific design factors, the programmed threshold voltage distributions in memory may change with writing and erasing data (cycling), reading data (read disturb), time (retention), etc., in a slow or fast manner. In other words, bit error rates for Flash memory blocks increase with time and use. As memory blocks are used, each program/erase (P/E) cycle performed on the blocks causes damage, which in turn increases the corresponding bit error rate.

Moreover, although increases in bit error rates due to retention and/or read disturbances are not permanent in the sense that the memory blocks affected are not being irreversibly damaged, these unfavorable declines in performance are only remedied when the memory blocks are erased or re-calibrated. Thus, block calibration, also known as read voltage shifting, is an important aspect of enhancing endurance and retention for storage systems, e.g., particularly enterprise-level Flash systems, by reducing the RBER experienced. This block calibration corresponds to the read voltages and refers to algorithms that are able to track the changes of the threshold voltages, thereby significantly improving the performance consistency in the respective device by reducing read tail latency which would otherwise result from error recovery mechanism invocations.

Moreover, adjustments to the read voltages are applied during a read command accordingly. It follows that the threshold voltage represents the voltage required to turn on the transistor of a given Flash memory cell and its value depends on the amount of charge stored during programming. However, the read voltage is a bias voltage, the value of which is typically between the threshold voltage of two adjacent logical states, e.g., as is explained in further detail below in FIG. 5.

Figure 5:
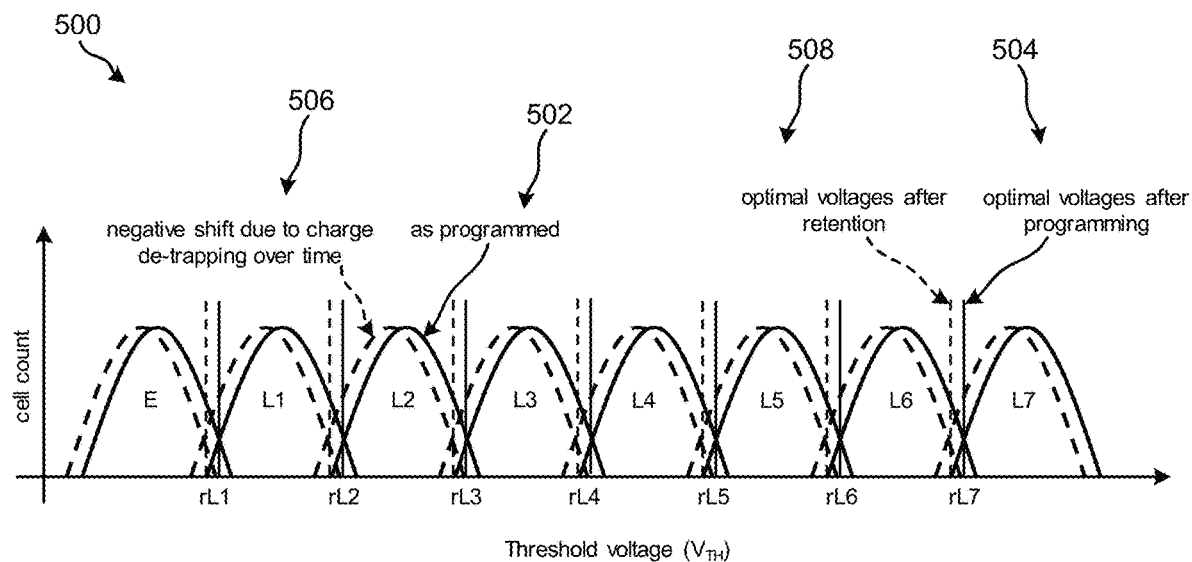
FIG. 5 is a graph which illustrates the threshold voltage shifting phenomenon, in accordance with one embodiment.

Referring momentarily to FIG. 5, a graph 500 illustrating the threshold voltage shifting phenomenon is illustrated in accordance with an example. The x-axis of the graph 500 represents the programmed threshold voltage VTH, while the y-axis represents the corresponding cell count of a TLC NAND memory block. In TLC NAND, each memory cell stores 3 bits of information, therefore, the VTH distributions correspond to 8 possible discrete levels (E, L1, . . . , L7). The solid distributions 502 indicate the $V_{TH}$ levels after programming. The vertical solid lines 504 indicate the read voltages (rL1, . . . , rL7) that are optimal for the $V_{TH}$ distributions 502. The dashed distributions 506 indicate a negative shift of the $V_{TH}$ levels due to charge loss over time. Because of this negative shift to lower voltages, the read voltages 504 are no longer optimal. Indeed, a negative offset must be applied to the read voltages in order to account for the changes of the $V_{TH}$ distributions from 502 to 506. The vertical dashed lines 508 indicate the read voltages (rL1, . . . , rL7) that are optimal during retention for the $V_{TH}$ distributions in 506. In general, each of the 8 levels (E, L1, . . . , L7) shown in the figure may have a different $V_{TH}$ shifts and thus, each of the 7 read voltages (rL1, . . . , rL7) may have a different optimal shift.

Accordingly, the read voltage shift values are preferably determined shortly after a block has been written to and/or periodically thereafter. The threshold voltage can be considered an index of the memory state, as determined by measuring the source-drain current when a control gate bias is applied to the memory cell. Typically, upon a read operation, a read voltage between adjacent nominal threshold voltages is used to determine the memory cell state. As the threshold voltage value of the memory cell changes (as explained above), the read voltage applied during a read operation is preferably shifted using a read voltage shift value to obtain optimal readout conditions and minimize bit error rates. Subsequently, the optimal read voltage shift values may be updated periodically, e.g., in a background health check.

Previous attempts to maintain efficient memory BER performance typically included inspecting the read voltages for each block of memory in a sweeping fashion or by a read voltage shifting algorithm that tracks and corrects the read voltages depending on how the threshold voltage distributions have changed as a result of cycling or retention or other disturbing effects. Moreover, upon identifying a block which was a calibration candidate, these previous attempts would perform block-level calibrations in which all pages in the identified block would be calibrated. It follows that these previous attempts involved inspecting each block of memory individually. Furthermore, although a block of memory is identified as being a candidate for calibration, typically not all pages in the block benefit from the calibration.

Accordingly, these previous attempts suffered from significant inefficiencies not only in the process of identifying portions of memory which would benefit from calibration, but also in performing the calibration process itself, as numerous pages would often be unnecessarily calibrated. Moreover, in modern 3-D TLC and QLC NAND flash, the number of pages in a block and the number of blocks in a package have been substantially increased with respect to previous generation 2-D NAND Flash. As a result, it may take longer before a particular page or block is inspected during the regular background process. Accordingly, these previous attempts suffered from high RBER triggering events of higher probability due to the longer times before the corresponding pages or blocks are inspected.

In sharp contrast to the aforementioned shortcomings experienced by conventional products, various ones of the embodiments included herein are able to selectively avoid calibrating certain page groups in a block and/or entire blocks themselves without increasing the risk of experiencing an uncorrectable read error as a result. This significantly reduces the number of unnecessary block calibrations which are performed while maintaining efficient memory utilization and desirable RBER levels, e.g., as will be described in further detail below.

Figure 6A:
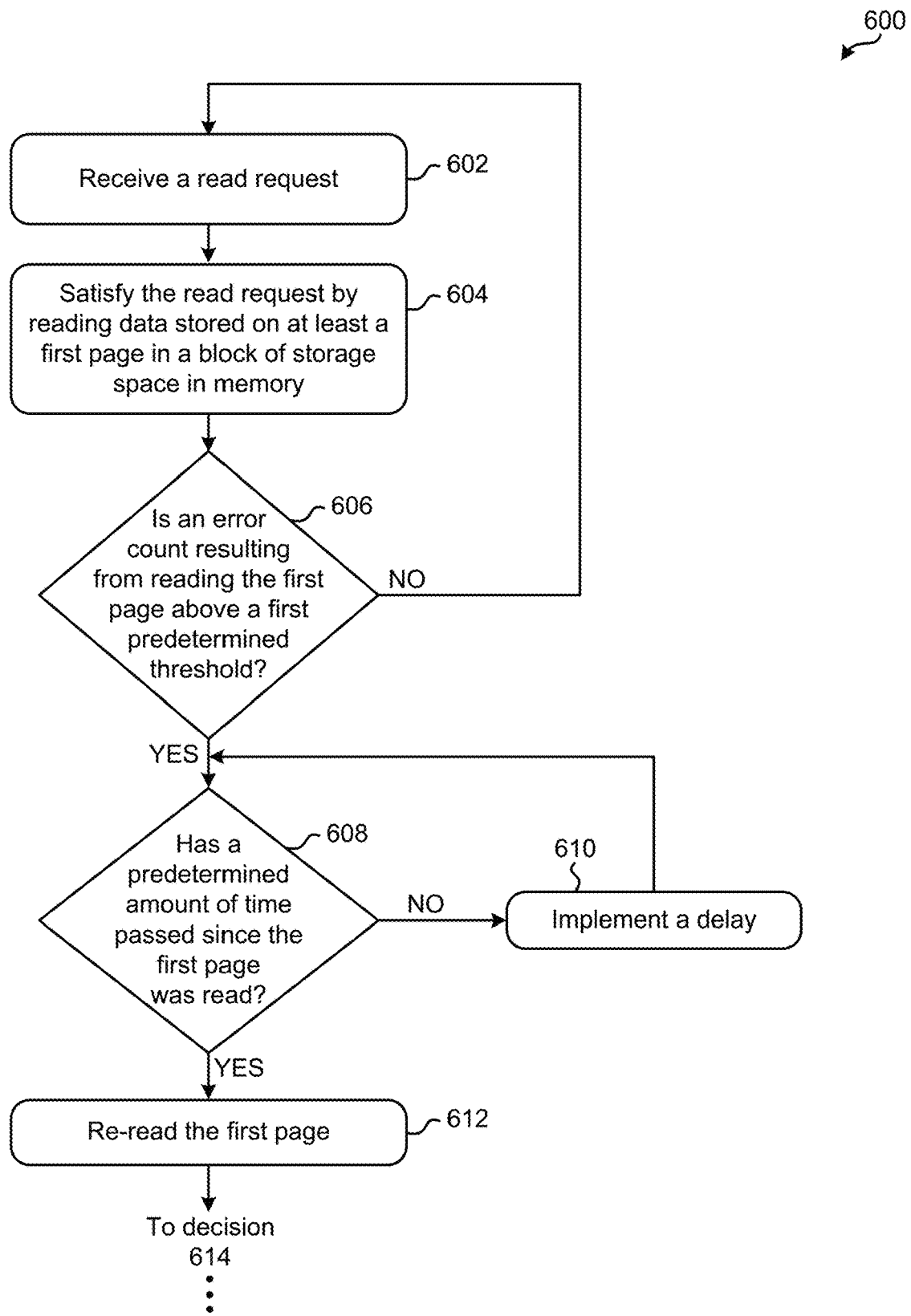
FIG. 6A is a flowchart of a method, in accordance with one embodiment.
Figure 6A:
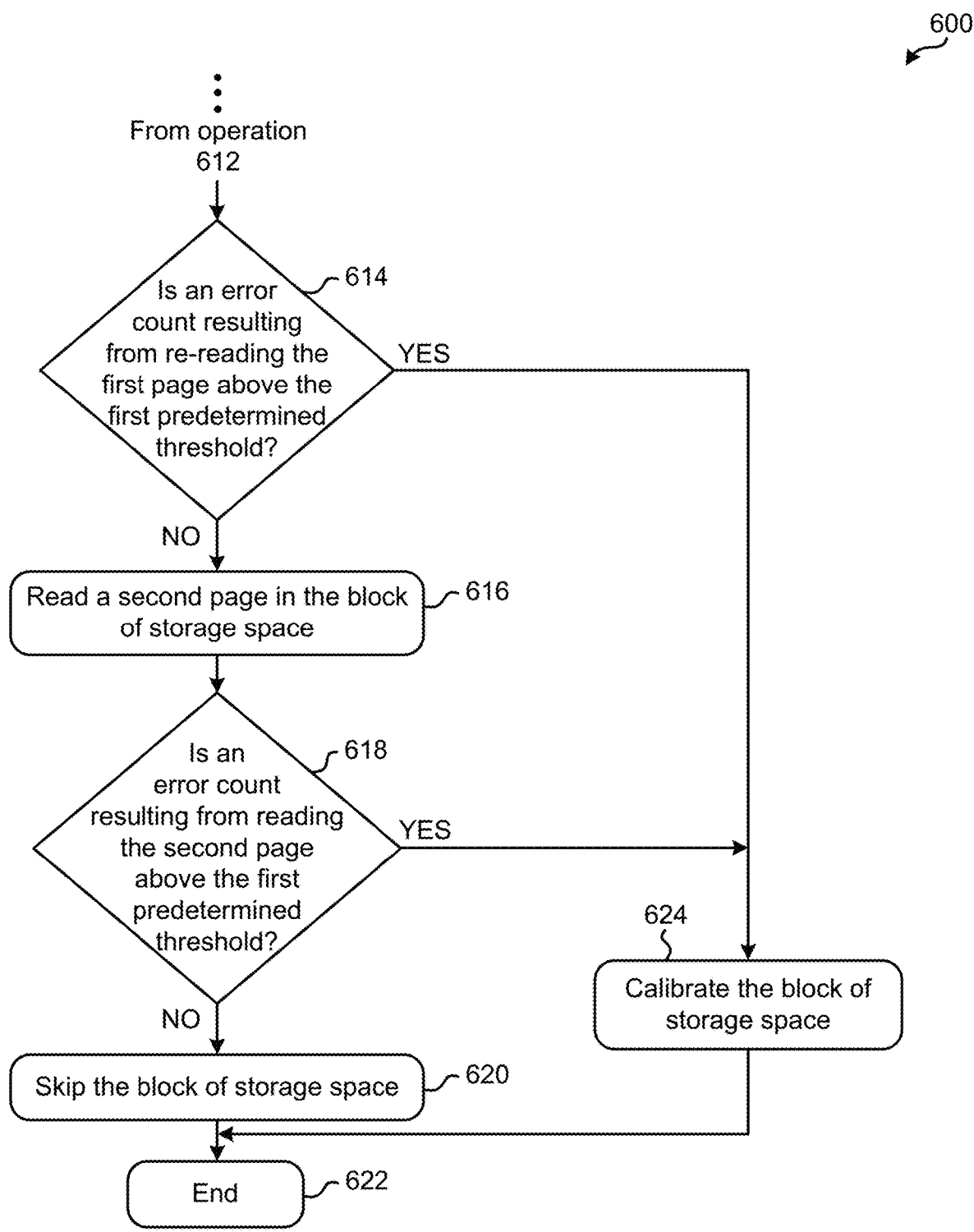

Referring now to FIG. 6A, a flowchart of a method 600 for determining whether to calibrate a page (or page group) is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, a computer, etc., or some other device having one or more processors therein. Thus, in some embodiments, method 600 may be a computer-implemented method. It should also be noted that the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes receiving a read request (e.g., command). Depending on the approach, the read request may be received from a user, an application being run, as part of a read scrub operation, etc. Moreover, operation 604 includes satisfying the read request by reading data stored on at least a first page in a block of storage space in memory, e.g., depending on the amount of data which corresponds to the received read request.

Moving to decision 606, a determination is made as to whether an error count resulting from reading the first page is above a first predetermined threshold. As shown, method 600 returns to operation 602 in response to determining that an error count resulting from reading the first page is not above the first predetermined threshold. In other words, method 600 returns to operation 602 in response to determining that the read request was satisfied successfully, e.g., such that additional read requests may be received and performed.

However, returning to decision 606, method proceeds to decision 608 in response to determining that the error count resulting from reading the first page in the block of storage space in memory is above the first predetermined threshold. In other words, method 600 proceeds to decision 608 in response to detecting that an undesirably high error count resulted from reading the first page. It should be noted that "above a predetermined threshold" is in no way intended to limit the invention. Rather than determining whether a value is above a given threshold, equivalent determinations may be made, e.g., as to whether a value is within a predetermined range, whether a value is outside a predetermined range, whether an absolute value is above a threshold, whether a value is below a threshold, etc., depending on the desired approach. Moreover, the threshold may be predetermined (e.g., by a user) in some approaches, while in other approaches the threshold is determined in real-time based on performance characteristics, arbitrarily selected, etc.

Looking to decision 608, a determination is made as to whether a predetermined amount of time has passed since the first page was read. In response to determining that the predetermined amount of time has not yet passed since the first page was read, method 600 proceeds to operation 610 whereby a delay is implemented. The delay implemented in operation 610 is preferably sufficient enough to allow for the predetermined amount of time to pass, but is also preferably not so long as to unnecessarily reduce performance. Accordingly, the length of the delay varies, e.g., depending on the desired approach.

From operation 610, the flowchart returns to decision 608 such that the determination as to whether the predetermined amount of time has passed since the first page was read is repeated. In response to determining that the predetermined amount of time has passed since the first page was read, method 600 proceeds to operation 612. There, operation 612 includes re-reading the first page, and decision 614 includes determining whether an error count resulting from re-reading the first page is also above the first predetermined threshold.

The error count (e.g., RBER) of various pages of memory experience temporary increases over time for a variety of reasons. For instance, although a given page of memory is "healthy" (e.g., has experienced a relatively low number of program and erase cycles), certain situations may cause the given page to experience a temporarily increased RBER. Thus, by allowing for a sufficient amount of time to elapse before re-reading the first page, the processes described above allow for any such temporary increases in the error count to subside and avoid triggering a calibration operation unnecessarily. However, even in situations where the error count returns to a level which is below a predetermined threshold as a result of allowing a given amount of time to elapse, additional steps are preferably taken to ensure that the performance of the first page is an accurate representation of the remainder of the given block.

Accordingly, in response to determining that the error count resulting from re-reading the first page is not above the first predetermined threshold, operation 616 is performed which includes reading a second page in the block of storage space. Although the second page may be arbitrarily selected in some approaches, it is preferred that the page which exhibited the poorest bit error rate of all pages in the respective block is selected as the second page read in operation 616. In other words, in preferred approaches the "second page" is the page of memory which experienced a highest error count of all remaining pages in the block of storage space following a last calibration of the block. It follows that information corresponding to the read performance of various blocks is determined and retained in memory. For example, the RBER corresponding to a last read operation performed on each block is stored in memory (e.g., a lookup table) for future use in some approaches.

Once the second page in the block of storage space has been read, decision 618 includes determining whether an error count resulting from reading the second page is above the first predetermined threshold. The read error resulting from reading the second page provides valuable information in determining whether a remainder of the corresponding block would benefit from a calibration operation, or whether the undesirably high error count determined in decision 606 was a temporary outlier which did not accurately represent the true status of a remainder of the pages in the given block. Moreover, in situations where the second page was selected such that it had a highest error count of the pages in the block of storage space following a last calibration of the block of storage space, a determination can be made that a remainder of the pages in the block would have an error rate which is lower than that of the second page.

Accordingly, in response to determining that the error count resulting from reading the second page is not above the first predetermined threshold, method proceeds to operation 620 from decision 618. There, operation 620 includes skipping the calibration of the block of storage space. In other words, the block of storage space is not calibrated at all and thereby effectively ignored at least until a later point in time. From operation 620, the flowchart of FIG. 6A proceeds to operation 622, whereby method 600 may end. However, it should be noted that although method 600 may end upon reaching operation 622, any one or more of the processes included in method 600 may be repeated in order to evaluate additional blocks of storage space.

However, returning to decision 614, method 600 proceeds to operation 624 in response to determining that the error count resulting from re-reading the first page is also above the first predetermined threshold. There, operation 624 includes actually calibrating the block of storage space. It follows that the block of storage space is ultimately calibrated in response to determining that the undesirably high error count was not a temporary increase, but rather an accurate representation of the performance of the first page. Moreover, an assumption is made in some approaches that a remainder of the pages in the same block have about the same performance as the first page.

Similarly, method 600 proceeds to operation 624 from decision 618 in response to determining that the error count resulting from reading the second page is above the first predetermined threshold. Thus, the block of storage space is ultimately calibrated in response to determining that the second page suffers from an undesirably high error count.

As described above, block calibration has been shown to be a key contributor to enhancing endurance and retention. By tracking the changes of threshold voltages, block calibration is able to significantly improve performance consistency in the respective device by reducing read tail latency which would otherwise result from error recovery mechanism invocations. Accordingly, the block calibration performed in operation 624 is able to improve performance of the block itself. However, because steps were taken prior to performing this block calibration which ensure that the pages included therein would actually benefit from such an operation, method 600 is also able to avoid performing unnecessary calibrations, thereby conserving computational resources while also achieving efficient performance thereof.

Figure 6B:
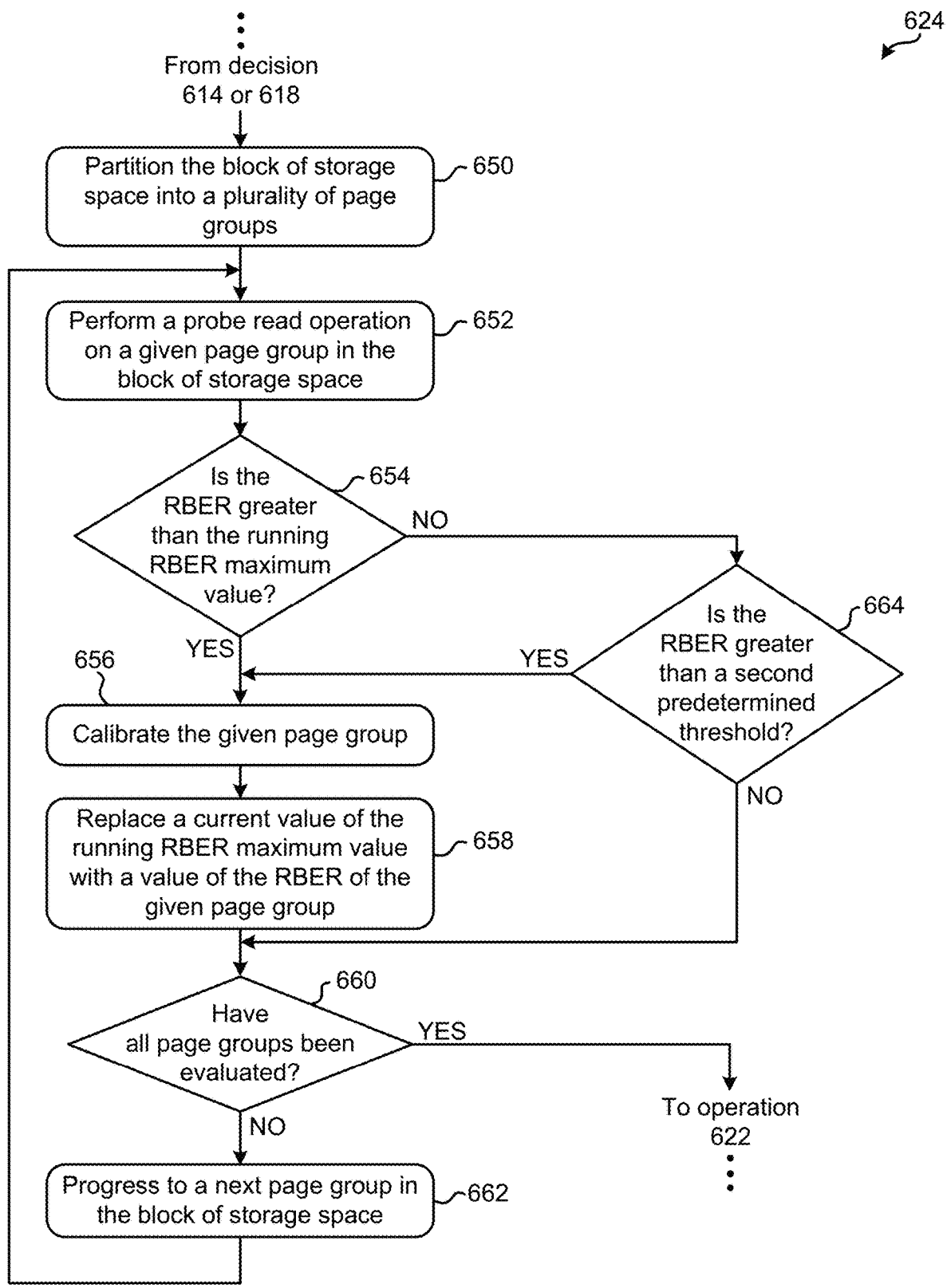
FIG. 6B is a flowchart of sub-processes for one of the operations in the method of FIG. 6A, in accordance with one embodiment.

Looking to FIG. 6B, exemplary sub-processes of actually calibrating the block of storage space are illustrated in accordance with one embodiment, one or more of which may be used to perform operation 624 of FIG. 6A. However, it should be noted that the sub-processes of FIG. 6B are illustrated in accordance with one embodiment which is in no way intended to limit the invention.

As shown, FIG. 6B includes partitioning the block of storage space into a plurality of page groups. See sub-operation 650. According to the present embodiment, the sub-processes of calibrating the block of storage space includes performing an iterative process for each page group in the block of storage space. In other words, the process of calibrating a block of storage space includes repeating one or more sub-processes for each page group which is included in the block. Accordingly, calibration metadata can be stored for each of the different page groups in some approaches. Moreover, the size and/or number of page groups which a given block of storage space is partitioned into varies depending on the size of the block, user preferences, industry standards, manufacturer specifications, limitations of the components used, etc. Accordingly, the sub-processes illustrated in FIG. 6B may be repeated in an iterative fashion any desired number of times, e.g., as would be appreciated by one skilled in the art after reading the present description.

Sub-operation 652 further includes performing a probe read operation on a given page group in the block of storage space. A first probe read operation is performed on an initial page group in the block (e.g., the page group having the first index) in some approaches. However, as mentioned above, each of the page groups in the block are evaluated in a recursive manner and therefore any page group in the block may be evaluated initially, e.g., depending on the desired approach.

Moreover, performing the probe read may actually include performing more than one read operation. For instance, a probe read performed on a page group in 3-D TLC NAND Flash that includes all three different page types actually involves performing a probe read for each of the three different page types included therein, e.g., the lower page, upper page, and top page. According to another example, a probe read performed on a page group in 3-D QLC NAND Flash actually includes performing a probe read for each of the three different page types included therein, e.g., the lower page, upper page, top page, and extra page. In another embodiment, the probe read may include performing a reduced number of reads than described above, in which case the page types known to have lower RBER could be temporarily or permanently omitted from the probe reads of certain page groups.

The results of the probe read operation are preferably evaluated in order to determine whether the pages included in the given page group would benefit from being calibrated. Accordingly, decision 654 includes determining whether the RBER of the given page group resulting from the probe read operation is greater than a running RBER maximum value. As the name suggests, the running RBER maximum value is a running value which is updated to reflect the maximum (largest) RBER experienced over the course of performing a probe read operation on each of the page groups in the block of storage space. In other words, the running RBER maximum value is initially set to zero, and as each probe read operation is performed, the resulting RBER is compared to the current value of the running RBER maximum value. In response to determining that the resulting RBER is greater than the current running RBER maximum value, the resulting RBER becomes the new running RBER maximum value (e.g., see sub-operation 658 below). It should also be noted that when comparing the RBER of a given page group with the running RBER maximum value, an additional margin may be used, e.g., as would be appreciated by one skilled in the art after reading the present description.

Referring still to FIG. 6B, the flowchart proceeds to sub-operation 656 in response to determining that the RBER of the given page group is greater than the running RBER maximum value. There, sub-operation 656 includes calibrating the given page group. Any calibration processes which would be apparent to one skilled in the art after reading the present description may be implemented in order to perform sub-operation 656. Moreover, sub-operation 658 includes replacing a current value of the running RBER maximum value with a value of the RBER of the given page group. As mentioned above, because the RBER resulting from performing the probe read is higher than the current value of the running RBER maximum value, the running RBER maximum value is updated accordingly.

Moving to decision 660, a determination is made as to whether all page groups in the given block of storage space has been evaluated. In response to determining that all of the page groups in the given block of storage space have not yet been evaluated, the flowchart proceeds to sub-operation 662. There, sub-operation 662 includes progressing to a next (e.g., subsequent) page group in the block of storage space, before returning to sub-operation 652 as shown.

Referring back to decision 654, the flowchart proceeds to decision 664 in response to determining that the RBER of the given page group is not greater than the running RBER maximum value. As shown, decision 664 includes determining whether the RBER of the given page group is above a second predetermined threshold. In other words, decision 664 includes determining whether the RBER resulting from the probe read performed on the given page group is above a second predetermined threshold. In some approaches, this second predetermined threshold serves as a "global safe RBER value" which is used to identify RBER values which are undesirably high, despite whether they are greater than a running RBER maximum value. It follows that the second predetermined threshold is typically different than the first predetermined threshold described above, but in some approaches the two thresholds may be similar and/or the same. The second predetermined threshold may also be predetermined by a user, dynamically adjusted based on performance, set by a manufacturer, determined by industry standards, depend on memory types, etc. According to an illustrative approach, which is in no way intended to limit the invention, the second predetermined threshold is defined as being a certain percentage (e.g., 50%) of the ECC correction capability for the given system. Accordingly, the second predetermined threshold is able to avoid situations in which the RBER experienced as a result of satisfying an actual read request is greater than the system's ECC capabilities are able to compensate for (correct), e.g., as would be appreciated by one skilled in the art after reading the present description.

In response to determining that the RBER of the given page group is above the second predetermined threshold, the flowchart proceeds from decision 664 to sub-operation 656, whereby the given page group is calibrated. However, in response to determining that the RBER of the given page group is not above the second predetermined threshold either, the flowchart proceeds directly to decision 660 as shown. It follows that sub-processes and decisions 652, 654, 656, 658, 660, 662, 664 are repeated in an iterative fashion until all page groups in the given block of storage space have been evaluated in a sequential manner.

Returning to decision 660, the process of actually calibrating the block of storage space is completed in response to determining that all of page groups in the given block of storage space have been evaluated. Thus, the flowchart returns to operation 622 of FIG. 6A as shown.

As mentioned above, the various approaches included herein are able to reduce the overall amount of calibration overhead by avoiding unnecessary calibration operations. For instance, by avoiding the calibration of blocks which have experienced a temporary increase in the error rate and by reduce the overhead of calibrations which are executed, the embodiments described herein are able to conserve system resources, reduce latency, prolong the effective lifespan of memory components, etc., while also maintaining efficient performance. As described above, this is achieved in some approaches by ensuring (e.g., using a calibration engine) that temporary increases in RBER are identified by implementing delays between read attempts, sufficient to allow temporary increases in the block read error counts to reduce. Thereafter, by re-reading a page X that experienced a high error count, a determination may be made as to whether the error count of page X remains unacceptably high, thereby constituting a calibration operation. Alternatively, if the RBER of the given block returns to a nominal (e.g., acceptable) value following the delay, it can be determined that the block experienced a temporary increase in the block read error count, and thereby would not benefit from a calibration operation. As a result, a calibration operation may be avoided without negatively effecting the performance of the system as a whole, thereby conserving resources.

Moreover, the various approaches described herein may be applied to any desired type of memory. For instance, in some approaches any one or more of the approaches included herein are applied to 3-D TLC NAND Flash. However, in other approaches the various approaches included herein may be applied to 3-D QLC NAND Flash memory, 2-D NAND Flash memory, etc.

Figure 7:
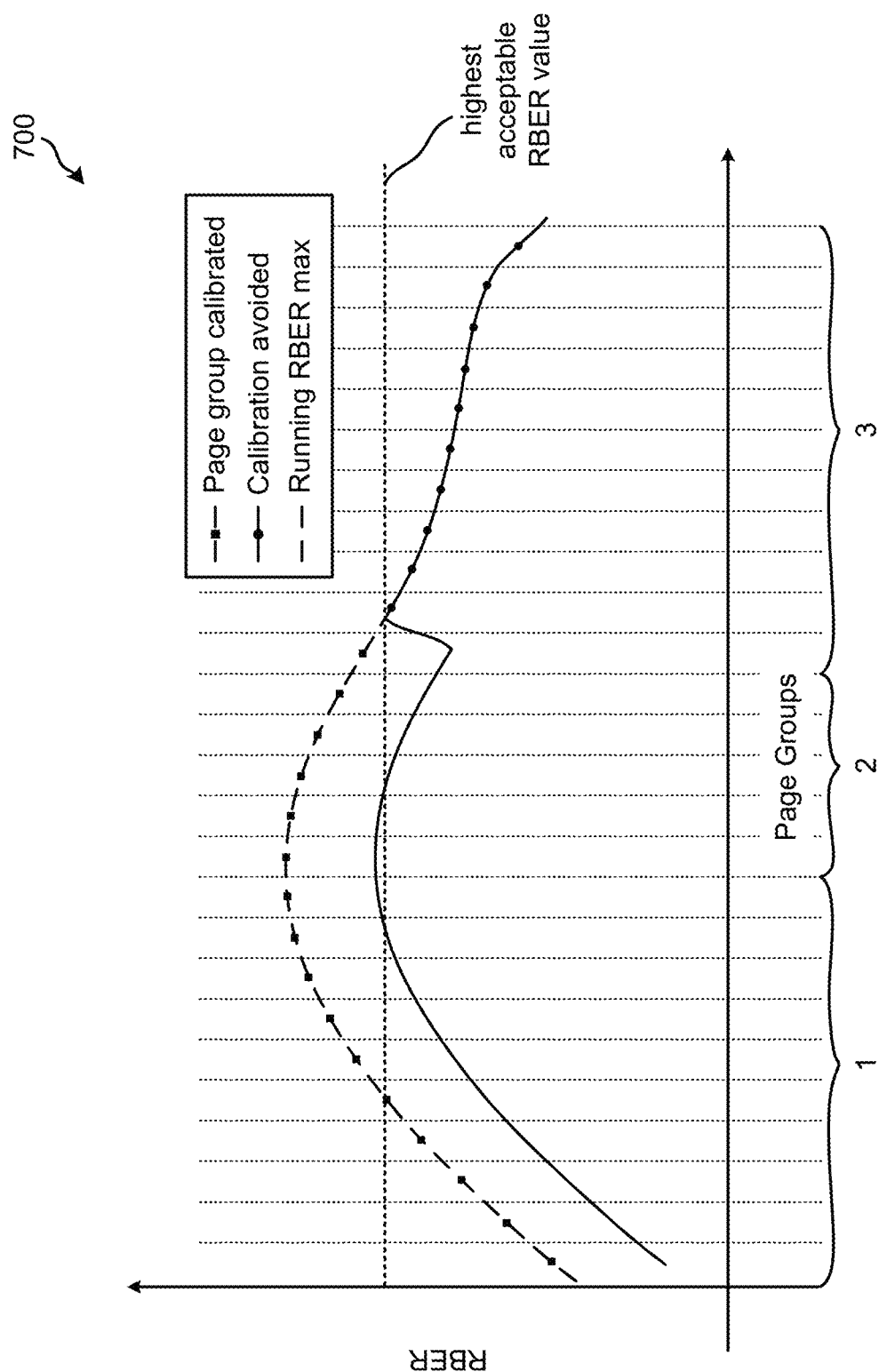
FIG. 7 is a graph representing RBER vs. page group index, in accordance with one exemplary embodiment.

Looking now to FIG. 7, a graph 700 presents the RBER for each page group in a given block of storage space in accordance with an in-use example, which is in no way intended to limit the invention. More specifically, the RBERs depicted in graph 700 are a result of applying various ones of the sub-processes described above with respect to FIG. 6B above. The dashed portion of the plot represents the RBERs experienced prior to performing a calibration operation for the respective page group, while the solid line represents the resulting RBERs regardless of whether a calibration operation was actually performed, e.g., as will soon become apparent.

In response to determining that a given block of storage space would benefit from a calibration operation, the process of actually calibrating the block is initiated. This calibration process preferably begins with a page group having the lowest index value, and progresses incrementally towards the page group with the highest index value. As mentioned above, a probe read operation is performed for each of the page groups in order to determine whether a calibration operation for the respective page group is desired.

The RBER resulting from the probe read of a given page group is compared to the running RBER maximum value in order to determine whether the given page group should be calibrated. In some approaches, the running RBER maximum value may be represented by an equivalent value of the number of bit errors in the given page group and/or the codeword itself, e.g., as would be appreciated by one skilled in the art after reading the present description.

If the probe read operation returns an RBER which is greater than the running RBER maximum value and/or which is above a RBER value determined as being a highest acceptable value (e.g., the second predetermined threshold value), then the given page group is calibrated. However, if the RBER returned for the page group is less than both the running RBER maximum value and the threshold RBER value, the given page group is skipped over and not calibrated at all. Accordingly, the procedure is allowed to advance to a subsequent page group and repeat the process.

As a result of the foregoing implementation, certain page groups are calibrated, while others are not. For example, in section 1 of the graph 700, the probe read operation performed on each of the page groups therein returns an RBER which is above the running RBER maximum value, as the RBER values continue to increase as the page group indexes continue to increase. As a result, each of the page groups in section 1 are calibrated as a result of producing a RBER which is greater than the running RBER maximum value, thereby reducing the RBER experienced for these page groups.

Looking to section 2, the RBER values returned as a result of the probe reads performed peak and actually begin to decrease. As a result, the RBER values for each of the page groups in section 2 are not greater than the running RBER maximum value. However, the RBER values for each of these page groups are greater than the RBER value determined as being a highest acceptable value (e.g., the second predetermined threshold value). Accordingly, a calibration operation is performed for each of the page groups in section 2 as well, thereby reducing the RBER experienced for these page groups.

Moving to section 3, the probe read operation performed on each of the page groups in this section return an RBER which is not greater than the running RBER maximum value, and which is also less than the highest acceptable value RBER value (e.g., the second predetermined threshold value). Therefore, calibration operations are avoided for each of the page groups in section 3. However, despite the fact that calibration operations are not performed for any of the page groups in section 3, graph 700 illustrates that the resulting RBER attributed thereto is comparable to that of the calibrated page groups in sections 1 and 2. In other words, overall performance is not sacrificed by deciding to not calibrate page groups which have an existing RBER that is in a desirable range.

It should again be noted that the results illustrated in FIG. 7 are in no way intended to limit the invention, but rather are presented by way of example. For instance, the number of page groups, the highest acceptable RBER value (e.g., the second predetermined threshold value), etc. vary depending on the particular approach, user preferences, system parameters, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 8:
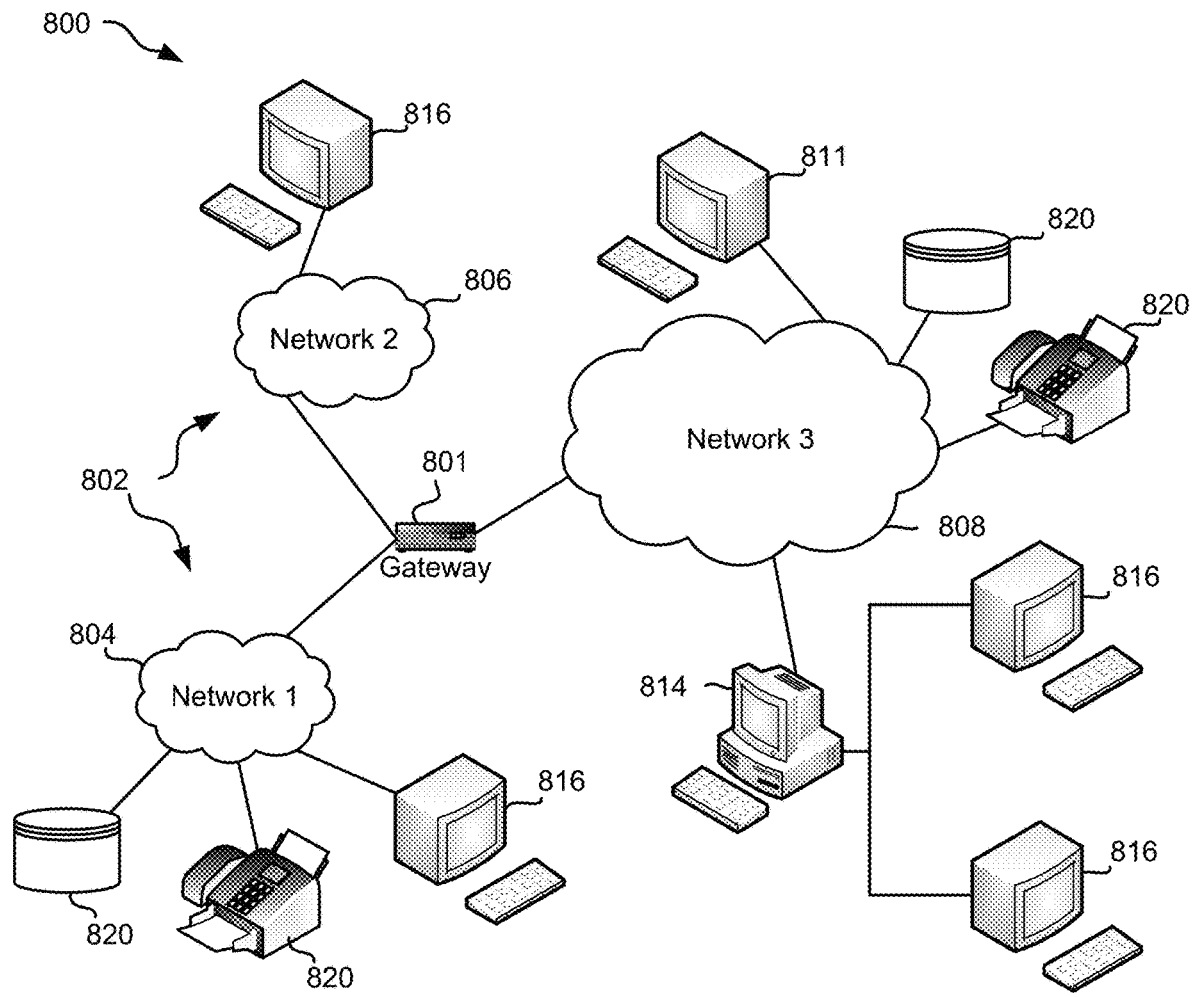
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
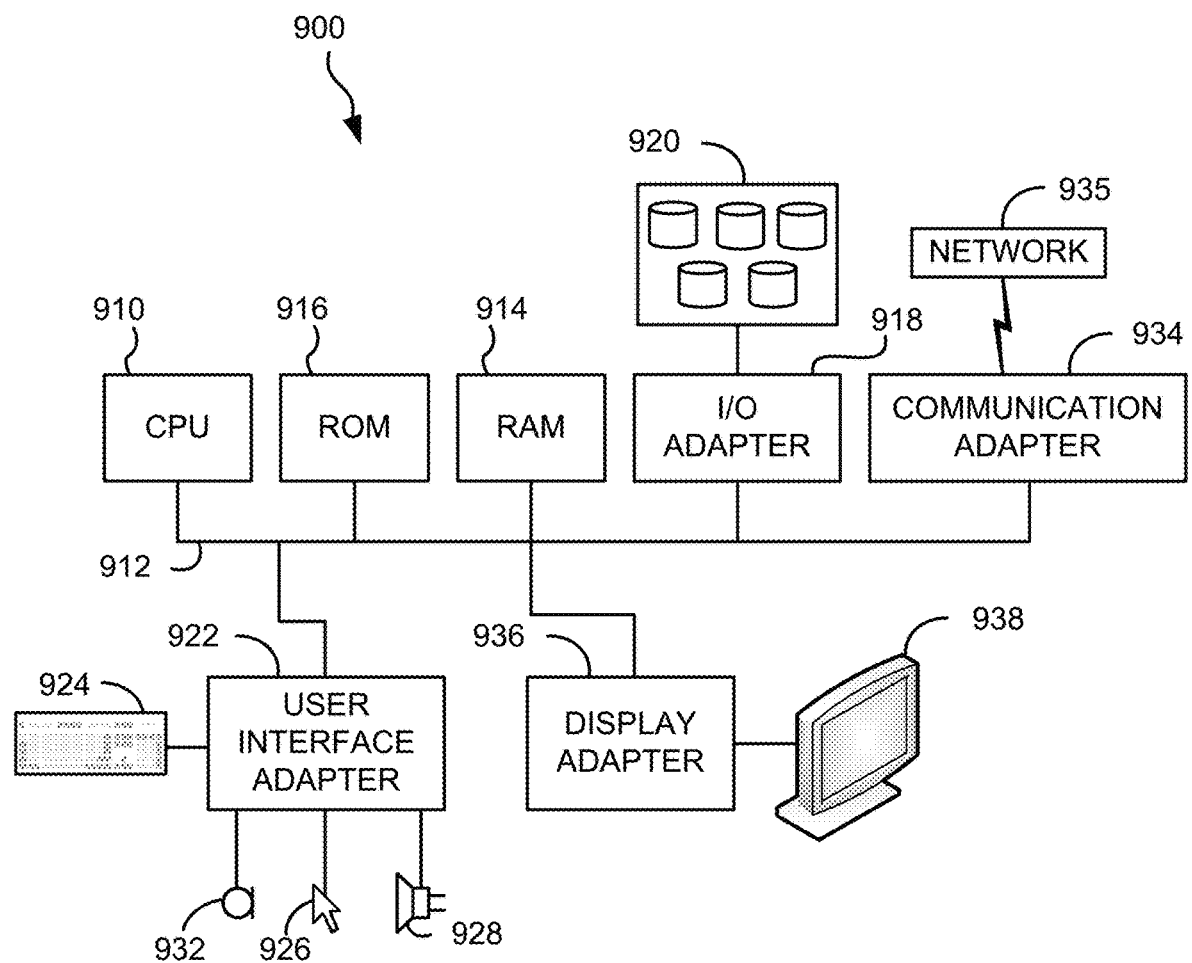
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
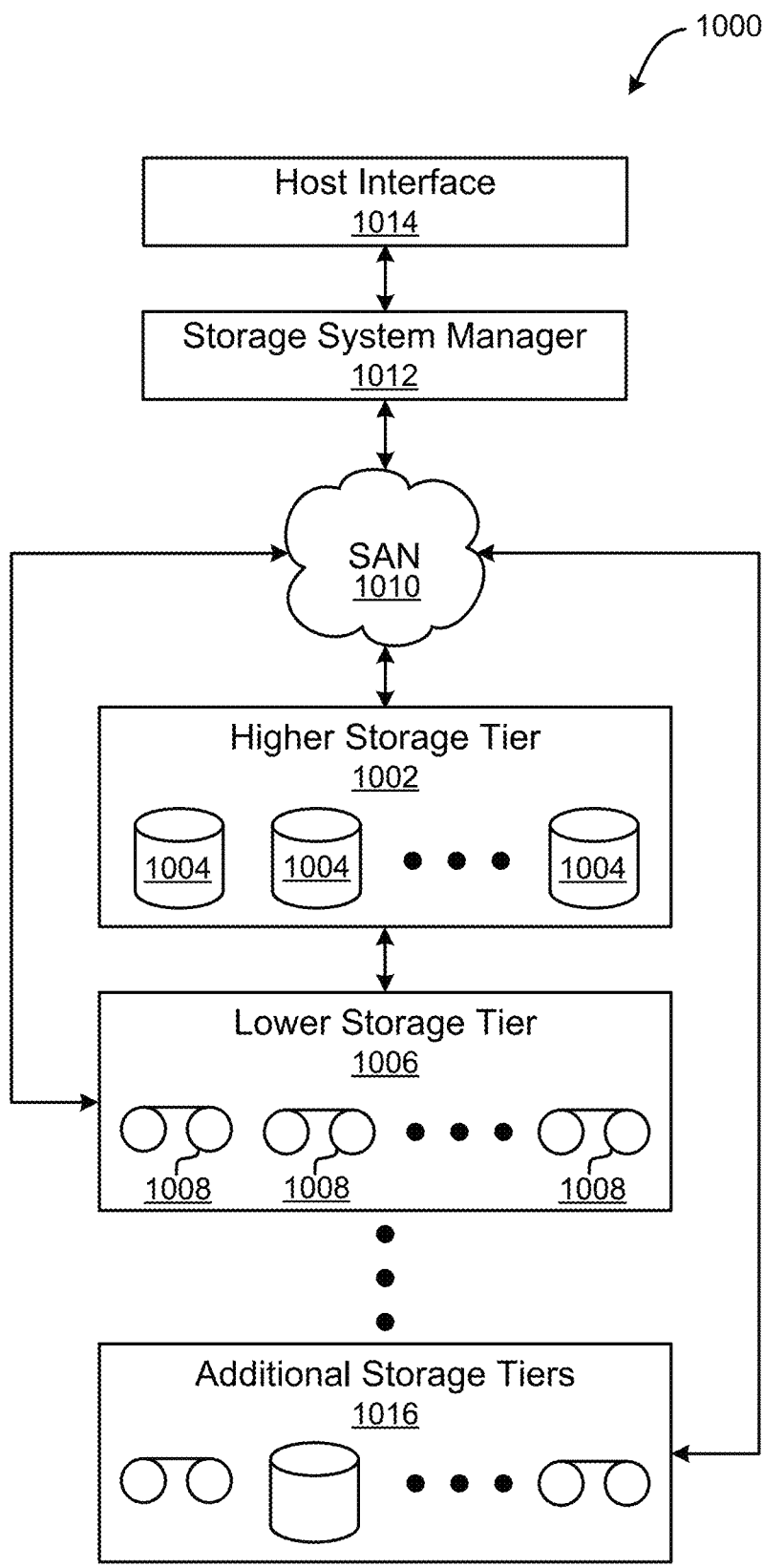
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

What is claimed is:

1. A computer-implemented method, comprising:
   detecting that an error count resulting from reading a first page in a block of storage space in memory is above a first threshold;
   reading a second page in the block of storage space, wherein the second page had a highest error count of the pages in the block of storage space following a last calibration of the block of storage space;
   determining whether an error count resulting from reading the second page is above the first threshold; and
   calibrating the block of storage space in response to determining that the error count resulting from reading the second page is above the first threshold.

2. The computer-implemented method of claim 1, comprising:
   in response to detecting that the error count resulting from reading the first page in the block of storage space in memory is above the first threshold, determining whether a predetermined amount of time has passed since the first page was read;
   in response to determining that the predetermined amount of time has passed since the first page was read, re-reading the first page;
   determining whether an error count resulting from re-reading the first page is above the first threshold; and
   calibrating the block of storage space in response to determining that the error count resulting from re-reading the first page is above the first threshold,
   wherein the second page in the block of storage space is read in response to determining that the error count resulting from re-reading the first page is not above the first threshold.

3. The computer-implemented method of claim 1, comprising:
   skipping calibration of the block of storage space in response to determining that the error count resulting from reading the second page is not above the first threshold.

4. The computer-implemented method of claim 1, wherein calibrating the block of storage space includes performing an iterative process for each page group in the block of storage space, the iterative process comprising:
   performing a probe read operation on a given page group in the block of storage space;
   determining whether a raw bit error rate (RBER) of the given page group resulting from the probe read operation is greater than a running RBER maximum value;
   in response to determining that the RBER of the given page group is greater than the running RBER maximum value:
     calibrating the given page group,
     replacing a current value of the running RBER maximum value with a value of the RBER of the given page group; and progressing to a next page group in the block of storage space.

5. The computer-implemented method of claim 4, comprising:
in response to determining that the RBER of the given page group is not greater than the running RBER maximum value, determining whether the RBER of the given page group is above a second threshold;
in response to determining that the RBER of the given page group is above the second threshold, calibrating the given page group; and
progressing to a next page group in the block of storage space.

6. The computer-implemented method of claim 5, comprising:
in response to determining that the RBER of the given page group is not above the second threshold, progressing to a next page group in the block of storage space.

7. The computer-implemented method of claim 1, wherein the memory includes three-dimensional triple-level cell NAND Flash.

8. A computer program product comprising a computer readable storage medium having program instructions embodied therewith, wherein the computer readable storage medium is not a transitory signal per se, the program instructions readable and/or executable by a processor to cause the processor to perform a method comprising:
detecting, by the processor, that an error count resulting from reading a first page in a block of storage space in memory is above a first threshold;
reading, by the processor, a second page in the block of storage space, wherein the second page had a highest error count of the pages in the block of storage space following a last calibration of the block of storage space;
determining, by the processor, whether an error count resulting from reading the second page is above the first threshold; and
calibrating, by the processor, the block of storage space in response to determining that the error count resulting from reading the second page is above the first threshold.

9. The computer program product of claim 8, the program instructions readable and/or executable by the processor to cause the processor to perform the method comprising:
in response to detecting that the error count resulting from reading the first page in the block of storage space in memory is above the first threshold, determining, by the processor, whether a predetermined amount of time has passed since the first page was read;
in response to determining that a predetermined amount of time has passed since the first page was read, re-reading, by the processor, the first page;
determining, by the processor, whether an error count resulting from re-reading the first page is above the first threshold; and
calibrating, by the processor, the block of storage space in response to determining that the error count resulting from re-reading the first page is above the first threshold,
wherein the second page in the block of storage space is read in response to determining that the error count resulting from either read of the first page is not above the first threshold.

10. The computer program product of claim 8, the program instructions readable and/or executable by the processor to cause the processor to perform the method comprising:
skipping, by the processor, calibration of the block of storage space in response to determining that the error count resulting from reading the second page is not above the first threshold.

11. The computer program product of claim 8, wherein calibrating the block of storage space includes performing an iterative process for each page group in the block of storage space, the iterative process comprising:
performing a probe read operation on a given page group in the block of storage space;
determining whether a raw bit error rate (RBER) of the given page group resulting from the probe read operation is greater than a running RBER maximum value;
in response to determining that the RBER of the given page group is greater than the running RBER maximum value:
calibrating the given page group,
replacing a current value of the running RBER maximum value with a value of the RBER of the given page group; and
progressing to a next page group in the block of storage space.

12. The computer program product of claim 11, the program instructions readable and/or executable by the processor to cause the processor to perform the method comprising:
in response to determining that the RBER of the given page group is not greater than the running RBER maximum value, determining, by the processor, whether the RBER of the given page group is above a second threshold;
in response to determining that the RBER of the given page group is above the second threshold, calibrating, by the processor, the given page group; and
progressing, by the processor, to a next page group in the block of storage space.

13. The computer program product of claim 12, the program instructions readable and/or executable by the processor to cause the processor to perform the method comprising:
in response to determining that the RBER of the given page group is not above the second threshold, progressing, by the processor, to a next page group in the block of storage space.

14. The computer program product of claim 8, wherein the memory includes three-dimensional triple-level cell NAND Flash.

15. A system, comprising:
a processor; and
logic integrated with and/or executable by the processor, the logic being configured to:
detect, by the processor, that an error count resulting from reading a first page in a block of storage space in memory is above a first threshold;
read, by the processor, a second page in the block of storage space, wherein the second page had a highest error count of the pages in the block of storage space following a last calibration of the block of storage space;
determine, by the processor, whether an error count resulting from reading the second page is above the first threshold; and calibrate, by the processor, the block of storage space in response to determining that the error count resulting from reading the second page is above the first threshold.

16. The system of claim 15, the logic being configured to:
in response to detecting that the error count resulting from reading the first page in the block of storage space in memory is above the first threshold, determine, by the processor, whether a predetermined amount of time has passed since the first page was read;
in response to determining that a predetermined amount of time has passed since the first page was read, re-read, by the processor, the first page;
determine, by the processor, whether an error count resulting from re-reading the first page is above the first threshold; and
calibrate, by the processor, the block of storage space in response to determining that the error count resulting from re-reading the first page is above the first threshold,
wherein the second page in the block of storage space is read in response to determining that the error count resulting from either read of the first page is not above the first threshold.

17. The system of claim 15, the logic being configured to:
skip, by the processor, calibration of the block of storage space in response to determining that the error count resulting from reading the second page is not above the first threshold.

18. The system of claim 15, wherein calibrating the block of storage space includes performing an iterative process for each page group in the block of storage space, the iterative process comprising:

performing a probe read operation on a given page group in the block of storage space;
determining whether a raw bit error rate (RBER) of the given page group resulting from the probe read operation is greater than a running RBER maximum value;
in response to determining that the RBER of the given page group is greater than the running RBER maximum value:
calibrating the given page group,
replacing a current value of the running RBER maximum value with a value of the RBER of the given page group; and
progressing to a next page group in the block of storage space.

19. The system of claim 18, the logic being configured to:
in response to determining that the RBER of the given page group is not greater than the running RBER maximum value, determine, by the processor, whether the RBER of the given page group is above a second threshold;
in response to determining that the RBER of the given page group is above the second threshold, calibrate, by the processor, the given page group; and
progress, by the processor, to a next page group in the block of storage space.

20. The system of claim 19, the logic being configured to:
in response to determining that the RBER of the given page group is not above the second threshold, progress, by the processor, to a next page group in the block of storage space.

* * * * *